United States Patent [19]

Brody

[11] 3,740,542
[45] June 19, 1973

[54] DECORATIVE LAMP

[75] Inventor: Norman M. Brody, Los Angeles, Calif.

[73] Assignee: Norman Industries, Inc., Santa Fe Springs, Calif.

[22] Filed: June 5, 1972

[21] Appl. No.: 259,582

[52] U.S. Cl. .................. 240/10 F, 161/5, 240/81 R
[51] Int. Cl. ............................................. F21p 1/00
[58] Field of Search ............. 240/10 R, 10 F, 10 G, 240/10 N, 10 P, 81 R; 161/1, 5, 6, 18

[56] References Cited
UNITED STATES PATENTS

| 3,660,211 | 5/1972 | Brody | 161/5 X |
| 3,364,090 | 1/1968 | Slipp | 161/5 X |
| 3,247,046 | 4/1966 | Fazekas | 161/5 |
| 2,839,670 | 6/1958 | Gladstone | 240/10 P X |
| 2,493,991 | 1/1950 | Morrison | 240/10 D |
| 2,117,088 | 5/1938 | French | 161/3 |

FOREIGN PATENTS OR APPLICATIONS

| 378,110 | 8/1932 | Great Britain | 240/10 F |

Primary Examiner—Joseph F. Peters, Jr.
Attorney—Max Geldin

[57] ABSTRACT

Decorative lamp comprising three-dimensional plastic colored article, e.g., a reproduction of a cartoon character and the like, in the form of a clear transparent, preferably cast polyester, resin body having a colored fiber glass paper inlay embedded in the resin, such inlay preferably being a silk screened multicolored configuration, the resin body having an external shape corresponding to the external shape of the colored inlay, forming a three-dimensional plastic duplicate of the colored inlay having substantially the corresponding coloration and outlines of the colored fiber glass paper inlay, and creating a three-dimensional effect to the eye of an observer, such resin body being provided with a cavity in the rear portion thereof and behind the embedded fiber glass paper inlay, and an artificial lighting means such as an electric lamp positioned within the cavity, whereby light from the lighting means is transmitted through the fiber glass paper inlay and through the resultant colored resin body to the front surface thereof, to brightly and uniformly light the entire colored resin body. According to another embodiment, a translucent or opaque resin body is attached to the rear surface of the transparent resin body and substantially surrounding the cavity therein, reducing the amount of light passing through the rear of the lamp asembly and also providing a more finished appearance of the article.

25 Claims, 10 Drawing Figures

Patented June 19, 1973
3,740,542
3 Sheets-Sheet 1
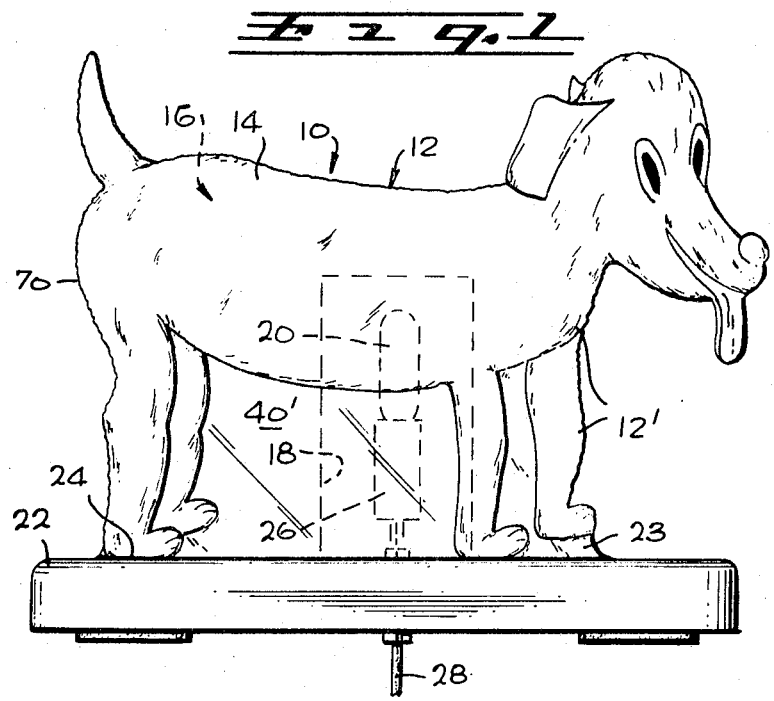
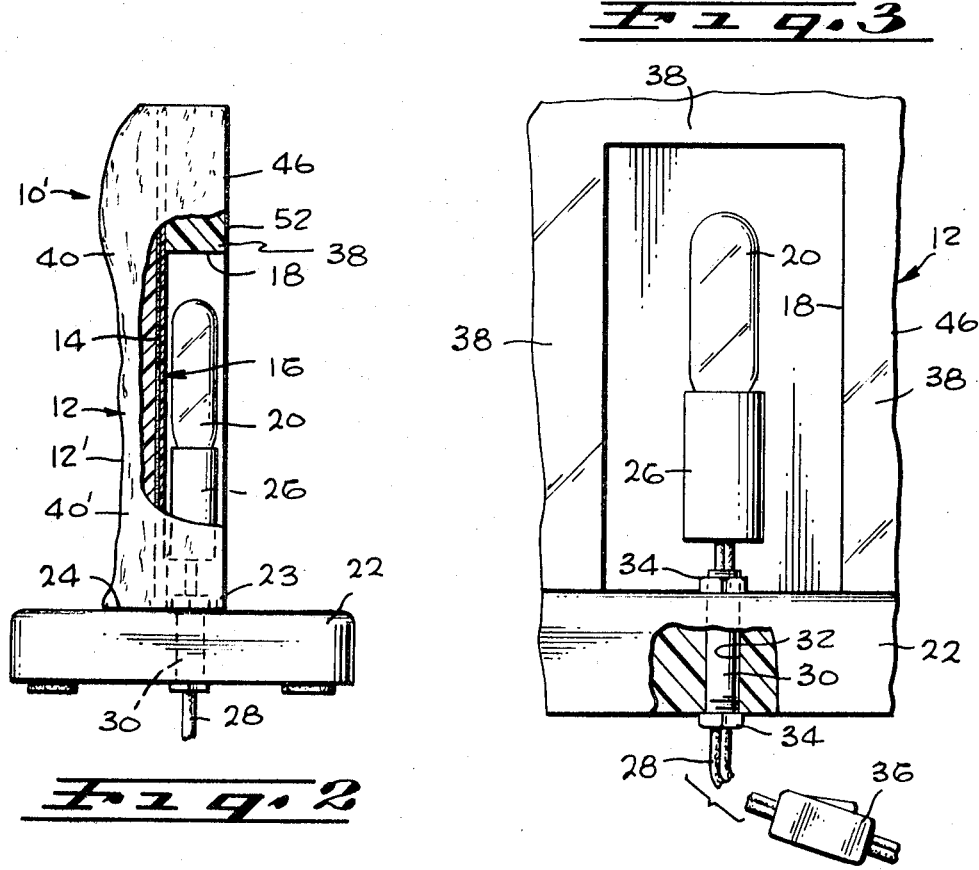

Patented June 19, 1973
3,740,542
3 Sheets-Sheet 2
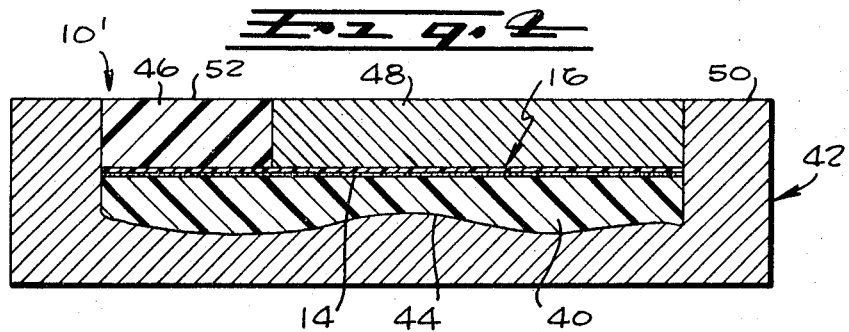
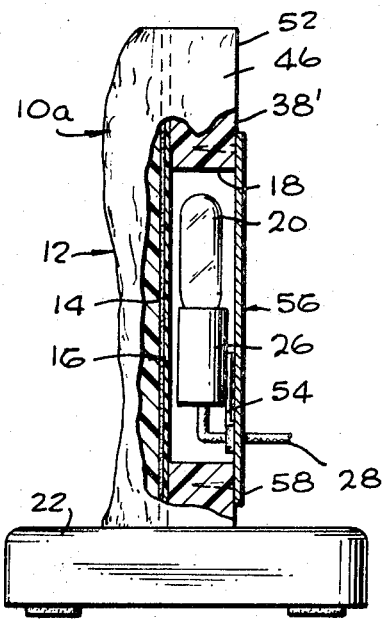
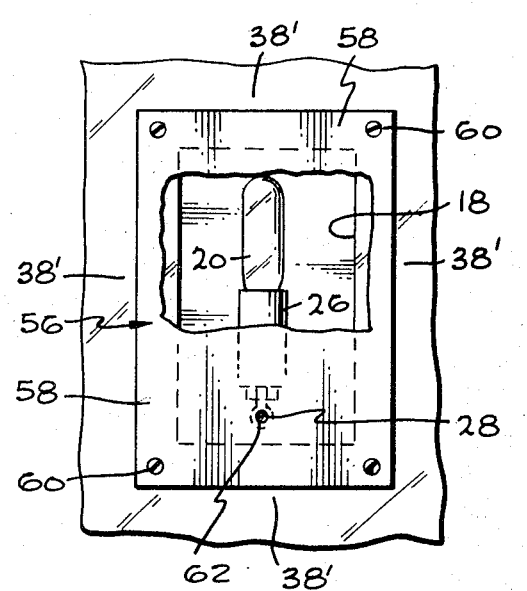
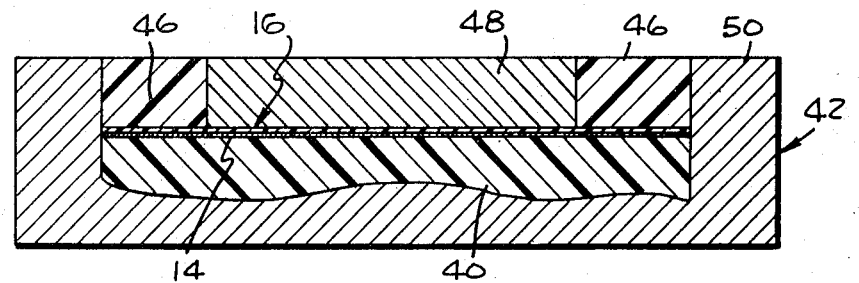

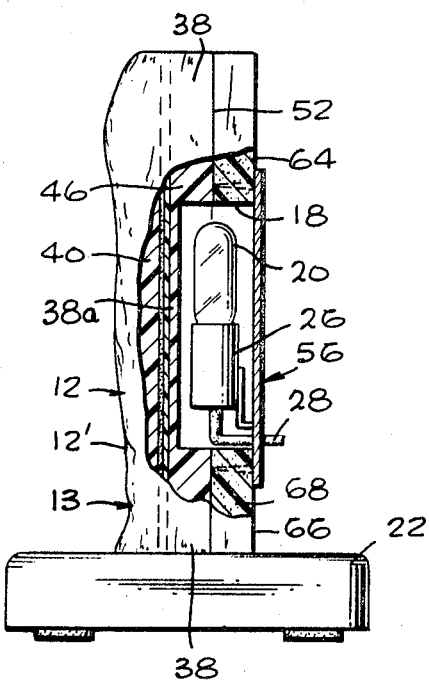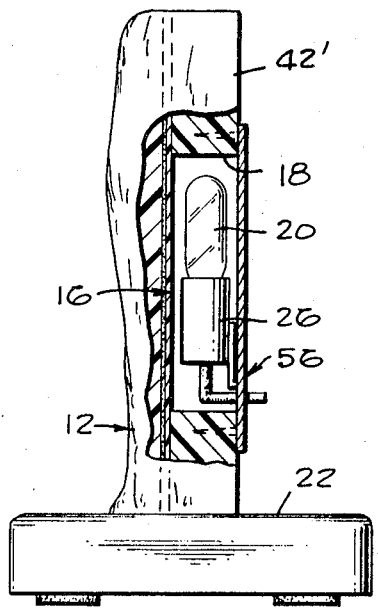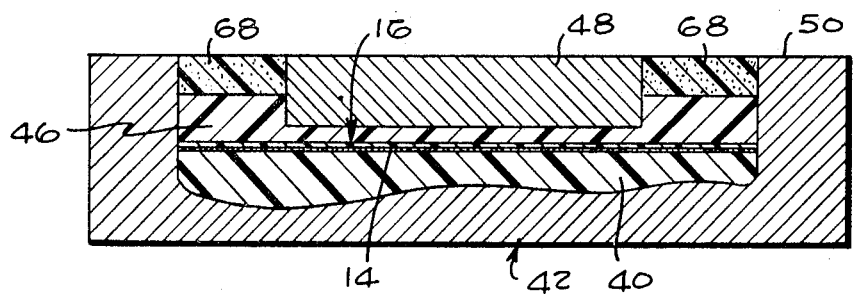

DECORATIVE LAMP

This invention relates to production of a decorative lamp, particularly designed for use in children's rooms, comprising a three-dimensional colored, preferably multicolored, resin body, formed by embedding a colored or multicolored fiber glass paper inlay, into the resin body, e.g., a polyester cast resin body, such colored cast resin body being provided with a cavity in the rear thereof, the cavity being adapted to receive a lighting means to serve as a light source for uniformly and brightly illuminating the colored cast resin body transmitting the colored representation on the colored fiber glass paper inlay.

In my copending application Ser. No. 53,918, filed July 10, 1970, now U.S. Pat. No. 3,695,982, there is disclosed production of a three-dimensional plastic colored article produced by forming a colored, particularly multicolored reproduction, pattern or design, such as that of a cartoon character, preferably by silk screening, on a fiber glass paper, and embedding the colored fiber glass paper in a clear polyester resin in a mold having the shape and configuration of the colored fiber glass paper, resulting in a three-dimensional plastic duplicate of the colored fiber glass inlay, having the corresponding coloration and outlines of the colored inlay, and creating a pleasing three dimensional effect when viewed.

A modified, compact and simple decorative lamp is provided according to the present invention, embodying a three-dimensional plastic colored article produced substantially according to my above-identified application Ser. No. 53,918, and which is provided with a cavity in the rear thereof, that is in the rear surface of such resin body, the cavity being adapted to receive a light source in the form of an artificial lighting means such as an electric lamp, which is suitably mounted in the cavity, the fiber glass paper inlay of such three-dimensional plastic colored article being positioned in front of the cavity and in front of the light source. Thus, the cavity provided in the rear surface of the resin body and the light source therein are substantially surrounded by the clear resin body. Although the resin body can be formed of various resins, as disclosed in greater detail hereinafter, in preferred practice a cast polyester resin is employed, due to its high degree of compatibility with the colored fiber glass paper inlay, as described in my above copending application Ser. No. 53,918, its high optical clarity, ready availability and its relatively low cost. The light from the lighting means in the cavity provided in the resin body is transmitted through the fiber glass paper inlay and through the resultant colored resin body to the front surface thereof, to light evenly and brightly the entire colored resin body.

In preferred practice the light source or electric lamp is positioned entirely within the cavity so as to light the entire clear resin body forwardly of the cavity, as well as the rearwardly positioned clear resin body portions surrounding the cavity and the light source therein, the lighting of such surrounding portions of the resin body aiding in illuminating the entire colored resin body more evenly.

According to a modification of the present invention, by application of a translucent to opaque resin body to the rear surface of the clear resin body, the above-noted cavity being then provided through the former body and through a portion of the forwardly extending clear resin body, light from the lamp disposed in the cavity is concentrated and distributed evenly forward through the clear transparent resin body containing the embedded colored fiber glass paper inlay, with a reduced amount or substantially no light passing through the translucent or opaque resin body to the rear, and also providing a more finished and pleasing appearance to the article when viewed from the rear of the decorative lamp.

A further feature of the invention includes mounting the light source or electric lamp in the cavity in the resin body by means of a plate which is secured over the cavity at the rear surface, and attached by suitable means to the rear surface of the resin body around the cavity.

The invention will be more clearly understood from the description below of certain preferred embodiments, taken in connection with the accompanying drawing wherein:

FIG. 1 is a front view of a decorative lamp according to the invention, comprising a colored plastic resin body in the form of a colored representation of a dog, with an electric lamp positioned in a cavity provided in the rear portion of the resin body;

FIG. 2 is a side view of FIG. 1, partially in section through the cavity in the resin body;

FIG. 3 is a rear view of the lamp of FIG. 1, showing the cavity and electric lamp positioned therein;

FIG. 4 illustrates the procedure for producing the decorative lamp of FIGS. 1-3;

FIG. 5 is a side view of a modified form of the decorative lamp of FIG. 1, shown partly in section;

FIG. 6 is a rear view of the lamp of FIG. 5;

FIG. 7 illustrates the procedure for producing the lamp of FIGS. 5 and 6;

FIG. 8 is a side view of another modification of the decorative lamp of the the multicolored shown partly in section;

FIG. 9 illustrates the procedure for producing the lamp of FIG. 8; and

FIG. 10 is a side view of still another modification of the decorative lamp of the invention.

The drawings are exaggerated for greater clarity.

Referring to FIGS. 1-3 of the drawing, there is illustrated a decorative lamp 10 according to the invention, including a transparent resin body 12 of a colored representation, which can be, for example, a cartoon character, shown in the form of a colored dog 14 silk screened onto a surface of a permeable fiber glass paper 16 which is embedded in the resin body 12, as described in detail hereinafter, the colored resin body 12 containing the colored dog inlay, being provided in its rear portion with a cavity 18, which has mounted therein an electric lamp or electric light bulb 20, adapted to be connected to an external source of electrical energy.

As previously noted, the resin body 12 preferably is in the form of a transparent cast polyester resin body, and the respective embodiments of the invention described below in connection with the drawings, also will be described in terms of the use of such preferred type of resin body, although as noted hereinafter, various resins can be employed in forming the transparent resin body 12.

The cast polyester resin body 12 containing the rear cavity 18 and the electric lamp 20 positioned therein, is mounted on a suitable base 22 which can be formed of any suitable material, preferably a plastic such as a cast polyester resin which can be colored as desired, for esthetic purposes, by adhesively securing the base portion of the resin body 12 to the upper surface of the base 22, e.g., by any suitable cement, indicated at 24, or by suitable mechanical means such as a fastener. The light bulb 20 is screwed into the conventional electric socket 26, and electric leads 28 are connected to such socket and pass through a sleeve 30 positioned in a bore 32 of the base, externally for connection to a suitable source of electrical energy (not shown). The sleeve 30 is held in position in the bore by means of nuts 34 threadably connected to opposite ends of the sleeve. A conventional switch 36 is provided for actuating the light bulb. The stiffness of the electric leads 28 maintains the light bulb 20 and socket 26, which are both lightweight, in position in the cavity 18, above the upper surface of the base 22, and free from contact with the interior surfaces of the cavity.

It will be seen in FIG. 2 that the light bulb 20 positioned in cavity 18, is located to the rear of the multicolored fiber glass paper representation 16, and is preferably disposed approximately at the center of the colored fiber glass inlay 16, and approximately at the center of the transparent cast polyester resin body 12. In this position of the light bulb, light rays from the bulb are transmitted forwardly through the multicolored fiber glass paper inlay 16 containing the colored representation 14 of the dog, and are then transmitted evenly through the cast resin body 12, to evenly and brightly light the entire colored cast resin body. This occurs even though the light source, that is the light bulb 20 is much smaller than the area of the cast resin body 12, so that an elongated light source extending over the entire length of the cast resin body 12 is not required. It was unexpectedly found that by incorporation of the electric light bulb 20 in a rear cavity such as 18 of the resin body, local bright spots are substantially avoided, when viewing the decorative lamp from the front thereof, and the light is essentially uniformly distributed throughout the resin body following its transmission through the colored fiber glass paper inlay 16, to evenly light all portions of the multicolored dog 14.

Further, the rear portion 38 of the clear transparent cast resin body 12, surrounding the cavity 18 on three sides thereof, also transmits light from the bulb 20 and aids in evenly distributing the light over the entire area of the resin body 12 including the outermost extremities thereof. Such transmitted light through the outwardly extending portion of the fiber glass paper inlay 16 and the adjacent outwardly extending portions of the resin body 12 highlights the colored reproduction of the evenly and brightly lighted colored representation of the dog transmitted through the clear cast polyester resin 12.

Referring now to FIG. 4 of the drawing, illustrating the procedure for producing the decorative lamp 10 of FIGS. 1-3, clear liquid polyester resin at 40 is poured into a mold 42, the mold having the surface contour 44 at the bottom thereof substantially corresponding to a negative replica of the surface contours to be reproduced in the outer surface of the cast resin body, and corresponding substantially to the external surface contours of the various parts of the body of the multicolored dog shown at 14 in FIGS. 1-3. In the present situation, provision can also be made in the mold, to provide a body of resin indicated at 40', below the body of the dog and between its front and back legs, such additional clear body of resin 40' forming an integral part of the clear resin body 12, and serving as a light medium for transmission of light to highlight the surrounding multicolored dog 14. However, the provision of such additional resin body 40' is optional.

The resin preferably employed in accordance with the invention, as previously noted, is a conventional clear polyester casting resin available commercially in the trade from various manufacturers. Generally, such polyester resins are produced by reaction of dibasic acids such as maleic acid, with dihydric alcohols, and usually containing an unsaturated monomer such as styrene. The polyester is available commercially in the first stage of polymerization, that is the ester formation stage. Just prior to use, that is just prior to pouring in the mold, a suitable peroxide catalyst such as methyl ethyl ketone peroxide, is added, to effect hardening, which can take place at room temperature over an extended period, or such hardening can be accelerated by the application of heat. Mixtures or blends of various types of polyester resins can be employed so as to obtain a desired type of cast resin product, which can be either hard and glass-like or relatively soft and flexible and hence shatter-proof if dropped.

The front pour resin at 40 fills about one-third to about one-half of the height within the mold, and a fiber glass paper inlay 16 containing the multicolored dog 14 of FIG. 1, die cut to the outer shape of the interior of the mold 42, is then placed on the surface of the body of liquid resin 40, with the colored dog 14 on the front surface facing the bottom or surface contour 44 of the mold. The fiber glass paper employed is a commercially available material which can range in thickness from about 5 to about 10 mils, e.g., about 7 mils. An illustrative type of fiber glass paper which can be used is the material marketed as K–Mat 155 or K–Mat 158, having a basis weight of 22 lbs/3,000 sq.ft. and a thickness of 7 mils. The characteristics of such fiber glass paper embedded in the resin allows the resin to soak through the paper without fracturing the resin body, that is, the fiber glass paper is compatible with the polyester resin, and the resin in effect assimilates the fiber glass paper and the colored reproduction thereon, that is the colored dog 14, as part of the resin body, as described in my above copending application Ser. No. 53,918.

In preferred practice, the colored pattern or reproduction, in the form of the multicolored dog 14 in the present embodiment, is applied to a surface of the fiber glass paper inlay 16 by a silk screen process, wherein various colors are individually applied to the surface of the fiber glass paper by means of a silk screen, in order to produce a multicolored reproduction such as the multicolored dog 14, which is clear and distinct.

In the above-noted silk screen process for producing a colored or multicolored reproduction such as the colored dog 14 on a fiber glass paper 16, the use of solvent type dyes particularly produces best results in the form of clear sharp colors when the colored fiber glass paper inlay is embedded in the polyester resin. Representative of such solvent type dyes are coal tar dyes, which can be aniline dyes, monoazo dyes and anthraquinone dyes, and the like, specific examples thereof being Oil Scarlet 6 G Base (Allied Chemical Corp.), Suddan Yellow (General Aniline and Film Corp.) and Luxol Fast Brilliant Blue–MBSN (DuPont Co.), as described in the above-noted copending application Ser. No. 53,918. Other components of the formulations which are employed in the silk screen process to produce a multicolored representation on the fiber glass paper, include organic solvents such as acetone, and resin vehicles such as cellulose acetate, alkyd resins, and the like. Although not preferred, pigment dyes, which are not solvent soluble but are dispersible in the various media including solvents and resins of the type noted above, can also be employed, as also described in the above-noted copending application Ser. No. 53,918.

Following placement of the colored fiber glass inlay 16 on the surface of the front pour 40, referring again to FIG. 4, additional liquid polyester resin at 46 is then poured over the front resin pour 40 and the colored fiber glass paper inlay 16, and around a mold insert or core 48 suitably maintained in position in the mold directly over the first resin pour 40 and the colored fiber glass paper inlay 16 placed thereon, such second resin pour 46 being provided to the predetermined depth or thickness of the colored cast resin body to be produced in the mold, up to the planar surfaces 50 of the mold, such resin 46 constituting a second or back pour. The liquid resin permeates through the fiber glass paper 16, completely wetting the paper without formation of bubbles in the resin adjacent the paper surfaces.

It will be noted that the mold insert 48 is of rectangular shape corresponding to the shape and size of cavity 18 shown in FIG. 3, so that the second resin pour or back pour 46 is disposed around three sides of the mold insert 48 corresponding to the three sides of the cavity 18 shown in FIG. 3, to form such cavity in the resulting unitary resin body 12 composed of both the front and back resin pours 40 and 46. The same type of polyester resin can be employed for both the front and back pours 40 and 46. Thus, for example, there can be employed as resins at 40 and 46 a mixture in the form of a blend of two different polyester resins, namely a blend of two parts of the polyester resin E-628 and one part of the polyester resin E-541 A, both marketed by Sylmar Chemical Company, to which is added 2 percent of methyl ethyl ketone peroxide as catalyst. Such resin blend upon curing forms a relatively flexible resin so that the decorative lamp, if dropped, for example as result of handling by a child, will not shatter and present a danger of injury. It will be understood, however, that any suitable polyester resin or blends thereof, for production of a hard glass-like resin body or a relatively flexible body can be employed, as desired for the above purposes.

Following a short period of setting at ambient temperature in the mold, e.g., about 20 to about 30 minutes, the resulting article or decorative lamp 10, comprising the cast resin body 12, formed of the resin pours 40 and 46, having embedded therein the fiber glass paper inlay 16 disposed parallel to the rear surface 52 of the resin body, is passed through an infrared oven, operating at a temperature ranging from about 140° to about 160°F. The resin assembly is permitted to remain in the oven for about 20 to about 50 minutes, and is then removed and permitted to cool. The resulting cured resin assembly is then removed from the mold 42, the mold insert 48 having been previously removed. The resulting cured assembly 10' as illustrated in FIGS. 1-3, thus comprises the cast clear resin body 12, colored by the multicolored dog 14 in the forward surface of the fiber glass paper inlay 16, and provided with the rectangular shaped cavity 18 in the rear portion of the resin body 12, directly behind the fiber glass paper inlay 16. The above resin assembly can be cured in the mold at room temperature, if desired, such procedure, however, requiring a longer cure period.

The resulting cured resin assembly 10' is then mounted on the base 22, and the electric light bulb 20 is positioned in the cavity 18, with the electric leads 28 passing through the base 22 as noted above.

As previously noted, and as described in my above copending application Ser. No. 53,918, the assembly 10' composed of the clear transparent cast resin body 12 formed of the resin bodies 40 and 46, viewing particularly FIG. 2, has a contoured front surface 12' generally corresponding to the body contours of the dog 14, and all of the colors and details of the colored dog 14 on the front surface of the colored fiber glass paper inlay 16, together with the corresponding irregular surface contours 12' of the resin body, combine when viewed from the front surface, to produce a three-dimensional replica of the multicolored dog, which appears to be animated when the decorative lamp 10 is viewed from different angles by an observer. The respective colored portions of the dog, evenly and brightly lighted by the light bulb 20 in cavity 18, and which appear through the cast resin body 12, are sharp and clear, and the lines of demarkation between the respective multicolored portions of the dog are also very sharp. When viewing the colored representation of the dog through the front of the cast resin body 12, the fiber glass paper 16 per se is practically invisible. It is noted that the dyes or pigments of which the colored dog is formed remain in the surface of the fiber glass paper inlay and do not permeate, wander or exude into the surrounding polyester resin body 12, which remains clear and transparent.

Upon viewing the colored figure of the dog through the front of the cast resin body 12 when lighted by the electric lamp 20, the figure of the dog stands out sharply since the major portion of the light is transmitted through the clear resin body 12. The result is a highly lighted brightly colored, animated appearing glass-like effect obtained from the figure of the dog, set off by any other lighted surrounding area of the transparent resin body such as 40' provided by transmission of the light through such portions of the transparent resin body surrounding the figure.

It is particularly noteworthy that transmission of the light from the light bulb 20 through the central portion of the fiber glass paper inlay 16 and the cast resin body 12 does not form any bright or hot spots in local areas of the cast resin body 12 but rather results in a very uniform brightly lighted representation of the multicolored figure of the dog therein.

Referring to FIGS. 5 and 6 there is shown a modified form 10a of the decorative lamp 10 illustrated in FIGS. 1-3, and wherein the rectangular cavity 18 in the rear surface of the transparent cast resin body 12, is positioned above the base of such cast resin body so that it is surrounded on all four sides of such cavity including the bottom thereof, by the resin body rear portions 38', formed by the resin back pour 46. This modification is produced, as illustrated in FIG. 7, by a procedure similar to that described above in relation to FIG. 4, including providing a first resin pour 40, placement of the colored fiber glass paper inlay 16 containing the multicolored dog 14 on the surface of such first pour, followed by application of a second or back pour of transparent polyester casting resin 46 thereon. However, in the embodiment of FIG. 7, the mold insert 48 is positioned in the mold so that the back pour resin 46 entirely surrounds such insert, whereby the resulting cavity formed by the insert, after curing the mold assembly and removal of the resulting cured lamp assembly from mold 42, is surrounded on all four sides by the rear resin body portions 38', as illustrated in FIG. 6.

Referring now again to FIG. 5, in this embodiment the electric lamp 20 is mounted within the cavity 18 so that it is approximately at the center of the cast resin body 12 and the multicolored dog 14 therein, by mounting the lamp socket 26 on a bracket 54, in any suitable manner, e.g., by suitable fasteners (not shown). Such bracket 54 is connected to a plate 56 of generally rectangular shape similar to the shape of cavity 18, but with length and width dimensions greater than those of cavity 18, the outer portions 58 of plate 56, extending beyond the cavity being secured to the rear surface 52 of resin body 12, by suitable means such as screws 60, to permit removal of plate 56 for replacement of the electric lamp 20, when the latter is burned out. Electric leads 28 from the lamp socket 26 pass through a bore 62 in plate 56 for connection to an external source of electrical energy.

It will be seen in the embodiment of FIGS. 5 and 6, that the back plate 56 not only serves to close off the interior of cavity 18 and the electric lamp 20 therein, preventing access thereto by a child, but this arrangement also serves as a convenient mounting for the electric lamp and its associated socket and electrical connections, and the plate 56, which can be formed of metal or opaque plastic, serves to prevent transmission of light to the rear and to concentrate the light in a forward direction, which can be facilitated, if desired, by provision of a reflective, e.g., metallic rear surface, on the plate 56, adjacent lamp 20.

Now referring to FIG. 8, there is shown a still further modification of the decorative lamp of FIGS. 5 and 6. According to the modification of FIG. 8, a rear resin portion 64 is provided, which can range from translucent to opaque, and which is connected to the rear surface 52 of the resin body 12. Thus, in the embodiment of FIG. 8, the cavity 18 extends from the rear surface 66 of the rear resin body portion 64, entirely through the rear translucent to opaque resin body 64 and into the rear transparent resin body portion 38 of the transparent cast resin body 12. The resulting assembly 13, including the translucent to opaque rear resin body portion 64, is produced by procedure illustrated in FIG. 9.

Referring to FIG. 9, a first clear resin pour 40 is placed in the mold 42, to a predetermined height therein, e.g., about one-third of the depth of the mold, and the multicolored fiber glass paper inlay 16 having the multicolored representation of the dog 14 is placed on the surface of the resin pour 40, as in the procedure illustrated in FIG. 4, followed by addition of a second or back clear resin pour 46. It will be noted in this embodiment that the mold insert 48 is disposed a short distance above the fiber glass paper inlay 16, so that a portion of the second pour 46, in front of the resulting cavity 18, viewing FIG. 8, extends a short distance to the rear of the fiber glass paper inlay 16. Hence in the embodiment of FIG. 8, the front surface of cavity 18 is separated from the fiber glass inlay 16 by a thickness 38a of the second resin pour 46.

In FIG. 9, it will be noted that the second or clear resin back pour 46 is provided to a height which is a predetermined distance below the surface 50 of the mold, and a third translucent to opaque resin pour 68 is then provided over the clear resin back pour 46, around the mold insert 48, and to a height approximately even with the top surface 50 of the mold. The resin pour 68 can be a white liquid translucent polyester resin which can be produced in any suitable manner, as by adding from about one-fourth to about 2 percent bismuth oxychloride white pigment pearl to the polyester resin. However, any suitable white dye or pigment can be employed for this purpose. Alternatively, the resin pour 68 can be formed from an opaque polyester resin of a preselected color such as blue or any other desired color, by means of the addition of suitable dyes or pigments to the polyester resin for this purpose.

The clear polyester resin pours 42 and 46, and the translucent to opaque resin pour 68, can be formed of the same type of polyester resin or resin blend described above. It will be understood however that any suitable polyester resin or blends thereof, for production of a hard glass-like resin body or a relatively flexible body can be employed, as desired for the above purposes.

By provision of a translucent to opaque third resin pour 68, as illustrated in FIG. 9 and described above, for production of the decorative lamp assembly shown in FIG. 8 and containing the corresponding translucent to opaque rear resin portion 64, the amount of light emitted by the lamp 20 and passing to the rear of the assembly around the outer edges of the back plate 56 is substantially reduced or eliminated, depending upon whether the resin body 64, e.g., is a white translucent resin body or an opaque resin body, thus concentrating the rays of light from lamp 20 in a forward direction through the clear transparent resin body portions 38a and 40 and through the intermediate multicolored fiber glass paper inlay 16, ans also transmitting light into the adjacent outer or side portions 38 of the resin body 46, to distribute the light evenly through both of the clear transparent resin body portions 46 and 40, forming the transparent resin body 12, thus further aiding in even light distribution completely around the multicolored figure. The modification of FIG. 8 also provides a more finished and pleasing appearance from the back. Note further that by provision of an opaque rear resin body 68, this substantially prevents any light from passing rearward, whereas if this latter characteristic is desired in the embodiment of FIG. 5, which does not include such opaque rear resin body 68, the outer edges of the plate 56 in FIG. 5 would require cutting and sculpturing to the exact outer shape of the resin body 12, in order to completely cover the rear surface of the resin body 12, to prevent light from passing to the rear.

It is noted that where a translucent to opaque rear resin body portion 68 is provided as in FIG. 8, such resin body portion is of a thickness such that it does not completely surround the edges of the cavity 18, the forward or inner portions of such cavity being surrounded on all four sides by the clear transparent resin body portions 38, since the latter clear transparent resin body portions aid substantially in transmitting light from the lamp around the sides of the cavity and through such outer clear transparent resin body portions 38 to provide an even distribution of light throughout the entire area of the clear transparent resin body 12.

FIG. 10 illustrates, on the other hand, a modification which, although within the purview of the invention, is not preferred according to the present invention. The modification of FIG. 10 is similar to that of FIG. 5, except that the second or back resin pour 40 of the modification of FIG. 5, is a translucent to opaque resin pour 42', and such translucent to opaque resin body 42' is disposed entirely around the cavity 18 and the lamp 20 therein, to the entire depth of the cavity, that is resin pour 42' extends forward substantially to the multicolored fiber glass paper inlay 16. The arrangement of FIG. 10, including such translucent to opaque resin body 42' entirely around the cavity and to the entire depth thereof, cuts down substantially the amount of light distributed through the clear resin body 12, since the amount of light transmitted into and through the translucent to opaque rear resin body 42' is substantially reduced or eliminated. This substantially reduces the amount of light which is transmitted and passes through the outer portions of the multicolored fiber glass paper inlay 16 and the outer portions of the clear transparent resin body 12, which are adjacent the outer translucent to opaque resin body portions 42'.

It has been found preferable, as an added feature, although not necessary, to roughen, as by sand blasting, the outer surfaces of the mold, as indicated at 70 in FIG. 1, so as to reduce the amount of light transmission through the clear transparent resin body 12 from the sides thereof, thus preventing one from seeing through the clear plastic resin body 12 from the sides or top of the lamp assembly. This presents a more pleasing and finished appearance to the article.

In practicing the invention, it has been found that the preferred resin employed for producing the resin body of the decorative lamp is a transparent polyester casting resin as described above, since it has been found particularly that such resin is highly compatible with the multicolored fiber glass paper inlay embedded in the resin body as described above, and with the inks and dyes employed in producing such multicolored fiber glass paper inlay, especially by silk screening procedures. However, various other plastics or resins alternatively can be employed to advantage in producing the resin body of the lamp assembly hereof. The resins employed according to the invention can be thermosetting or thermoplastic, preferably the former, and can include, for example, transparent polyester resins, acrylic resins, e.g., polymers or copolymers of acrylic acid, methacrylic acid, and esters of these acids such as methyl methacrylate and methyl acrylate polymers; vinyl resins or polymers such as polystyrene, vinyl acetate and vinyl chloride polymers, and their copolymers, or vinylidene chlorides; epoxies, such as the epoxy resin produced by reaction of epichlorhydrin and bisphenol A, melamine, such as melamine-formaldehyde, resins, and the like. Transparent resins of these types can be provided as casting resins or as molding resins.

It has also been found that by employing darker colors in the central portion of the multicolored fiber glass paper inlay, which is located directly in front of the electric light bulb of the lamp assembly of the invention, and brighter colors in the outer portions of the fiber glass paper inlay representation, this also aids in obtaining a more even distribution of light through the transparent plastic body.

If desired, in the embodiments illustrated in FIGS. 4, 7 and 9, the silk screen coloration of the dog 14 can be silk screened in reverse on the rear surface of the fiber glass paper 16. Also, if desired, the colored representation can be placed on both surfaces of the fiber glass paper, the colored representation being in reverse on the back side of the paper. However, it will be understood that any colored or multicolored character, representation or reproduction can be provided in the cast resin body 12, by employing any desired corresponding colored or multicolored fiber glass paper inlay for such cast resin body.

It will be further understood that any type of light source can be employed for positioning in the cavity 18 of the lamp hereof for illuminating the dog or other figure on the fiber glass inlay in the resin body, including, for example, panelescent light formed of a glowing flat metal, in place of an electric light bulb.

The decorative lamp of the invention can be employed for placement on a flat surface, e.g., as a table or desk lamp, or can have utility as a hanging or swag lamp, or as a lighting fixture.

Although the cavity 18 in the resin body 12 has been shown as rectangular, it will be understood that such cavity can have any desired shape, such as round, elliptical, polygonal, etc.

From the foregoing, it is seen that the invention provides a novel and highly attractive decorative lamp, which is an essentially integral article composed chiefly of a transparent resin body having incorporated in such body, a multicolored fiber glass paper inlay of a colored representation to be viewed, and a lighting means such as an electric lamp for evenly and brightly illuminating the multicolored representation through the transparent plastic or resin body. The lamp assembly is highly attractive for children's rooms, particularly where the multicolored representation is in the form of a cartoon character, and is easily and inexpensively produced from readily available commerical resins and plastics, is durable and safe.

While I have described particular embodiments of my invention for the purpose of illustration, it should be understood that other modifications and adaptations thereof may be made within the spirit of the invention, and hence the invention is not to be taken as limited except by the scope of the appended claims.

I claim:

1. A decorative lamp assembly which comprises a three-dimensional plastic colored representation comprising a transparent resin body having a colored fiber glass paper inlay embedded in said resin body, said resin body having a peripheral shape substantially corresponding to the peripheral shape of said colored inlay, a thickness substantially greater than the thickness of said fiber glass paper inlay, forming a three-dimensional plastic duplicate of said colored inlay, and having the corresponding coloration and outline of said colored fiber glass paper inlay; a cavity in the rear portion of said resin body behind said embedded fiber glass paper inlay, and lighting means positioned within said cavity, whereby light from said lighting means is transmitted through said fiber glass paper inlay and through the resin body to the front surface thereof, to light evenly and brightly the entire resin body.

2. A decorative lamp assembly as defined in claim 1, said resin body being a clear transparent polyester cast resin body.

3. A decorative lamp assembly as defined in claim 1, said lighting means comprising an electric lamp.

4. A decorative lamp assembly as defined in claim 1, said cavity being provided in the rear surface of said resin body and substantially surrounded by said resin body.

5. A decorative lamp assembly as defined in claim 4, said cavity being of a rectangular shape and surrounded on at least three sides by said resin body.

6. A decorative lamp assembly as defined in claim 4, said cavity being of rectangular shape and entirely surrounded by said resin body.

7. A decorative lamp assembly as defined in claim 4, said lighting means being positioned in said cavity behind said colored fiber glass paper inlay, and adjacent the central portion thereof.

8. A decorative lamp assembly as defined in claim 1, including plate means positioned over said cavity and enclosing same, and means mounting said lighting means on said plate means.

9. A decorative lamp assembly as defined in claim 1, including a plate positioned over said cavity and extending outwardly over the rear surface of said resin body adjacent said cavity, means securing said outwardly extending plate portion to said adjacent rear surface portion of said resin body, and means connecting said lighting means to said plate for supporting said lighting means in said cavity free from contact with the surrounding resin body.

10. A decorative lamp assembly as defined in claim 9, said lighting means being an electric lamp, and including electric leads extending from said light bulb through said plate for external connection to a source of electrical energy.

11. A decorative lamp assembly as defined in claim 10, said cavity being of rectangular shape, said electric light bulb being positioned in said cavity behind said colored fiber glass paper inlay, and adjacent the central portion thereof.

12. A decorative lamp assembly as defined in claim 11, said resin body being a clear transparent polyester cast resin body.

13. A decorative lamp assembly as defined in claim 1, including a translucent to opaque resin body connected to the rear surface of said transparent resin body, said cavity disposed in said translucent to opaque resin body and extending fowardly toward the rear portion of said transparent resin body.

14. A decorative lamp assembly as defined in claim 13, said cavity being provided in the rear surface of said translucent to opaque resin body and substantially surrounded by said last-mentioned resin body and by the adjacent rear portion of said transparent resin body.

15. A decorative lamp assembly as defined in claim 14, said transparent resin body and said translucent to opaque resin body each being composed of a polyester cast resin.

16. A decorative lamp assembly as defined in claim 14, said cavity being of rectangular shape and surrounded on at least three sides by said translucent to opaque resin body and by the adjacent rear portion of said transparent body.

17. A decorative lamp assembly as defined in claim 15, including plate means positioned over said cavity and enclosing same and means mounting said lighting means on said plate means.

18. A decorative lamp assembly as defined in claim 17, said lighting means being an electric lamp, said lamp being positioned in said cavity behind said colored fiber glass paper inlay, and adjacent the central portion thereof, said plate positioned over said cavity extending outwardly over the rear surface of said translucent to opaque resin body adjacent said cavity, means securing said outwardly extending plate portion to said adjacent rear surface portion of said last-mentioned resin body, and means connecting said electric lamp to said plate for supporting said lamp in said cavity free from contact with the surrounding resin body.

19. A decorative lamp assembly as defined in claim 1, said fiber glass paper inlay being multicolored, the front surface of said cast resin body being contoured to a predetermined shape in accordance with the multicolored design of said multicolored fiber glass paper inlay, the rear surface of said resin body being essentially planar.

20. A decorative lamp assembly as defined in claim 19, wherein said multicolored fiber glass paper inlay has a silk screened multicolored configuration on at least one side of said fiber glass paper.

21. A decorative lamp assembly as defined in claim 20, said resin body having both a peripheral shape and a surface contour substantially corresponding respectively to the peripheral and simulated shape of the colored configuration on said fiber glass paper inlay.

22. A decorative lamp assembly as defined in claim 19, wherein said colored fiber glass paper inlay is embedded in said transparent resin body between the front and rear surfaces of said resin body, said fiber glass inlay containing said colored configuration on the front surface thereof and facing the front contoured surface of said transparent resin body.

23. A decorative lamp assembly as defined in claim 19, said resin body being a clear transparent polyester resin body, and wherein said multicolored fiber glass paper inlay has a silk screened multicolored configuration on at least one side of said fiber glass paper, said resin body having both a peripheral shape and a surface contour corresponding respectively to the peripheral and simulated shape of the colored configuration on said fiber glass paper inlay.

24. A decorative lamp assembly as defined in claim 1, said resin body being selected from the group consisting of polyester, acrylic, vinyl, epoxy and melamine resins.

25. A decorative lamp assembly as defined in claim 23, said cavity being provided in the rear surface of said resin body, and substantially surrounded by said resin body, including a plate positioned over said cavity and extending outwardly over the rear surface of said resin body adjacent said cavity, means securing said outwardly extending plate portion to said adjacent rear surface portion of said resin body, and means connecting said lighting means to said plate for supporting said lighting means in said cavity free from contact with the surrounding resin body.

* * * * *